United States Patent [19]
Ando et al.

[11] Patent Number: 5,479,387
[45] Date of Patent: Dec. 26, 1995

[54] OPTICAL HEAD INCLUDING MULTIPLE PHOTO DETECTORS FOR READING SIGNALS AND ERROR SIGNALS FOR SERVOING FROM BOTH A READ-ONLY RECORDING MEDIUM AND A MAGNETO-OPTICAL RECORDING MEDIUM

[75] Inventors: Nobuhiko Ando; Ryo Ando; Kazuhiko Fujiie, all of Tokyo, Japan

[73] Assignee: Sony Corporation, Tokyo, Japan

[21] Appl. No.: 355,429

[22] Filed: Dec. 13, 1994

Related U.S. Application Data

[60] Continuation of Ser. No. 253,672, Jun. 3, 1994, abandoned, which is a division of Ser. No. 122,012, Sep. 15, 1993.

[30] Foreign Application Priority Data

Sep. 24, 1992 [JP] Japan .................................. 4-255023

[51] Int. Cl.$^6$ ................................................. G11B 7/095
[52] U.S. Cl. ..................................... 369/44.23; 369/44.37; 369/44.41; 369/58; 369/110; 369/112; 369/120
[58] Field of Search ............................... 369/44.23–44.24, 369/44.32, 44.37, 44.41–44.42, 54, 58, 110, 112, 120

[56] References Cited

U.S. PATENT DOCUMENTS

| | | | |
|---|---|---|---|
| 3,909,608 | 9/1975 | Le Merer et al. | 250/202 |
| 4,023,033 | 5/1977 | Bricot et al. | 250/201 |
| 4,561,032 | 12/1985 | Matsumoto et al. | 360/114 |
| 4,771,414 | 9/1988 | Yoshimatsu | 369/110 |

(List continued on next page.)

FOREIGN PATENT DOCUMENTS

| | | |
|---|---|---|
| 0294241 | 12/1988 | European Pat. Off. . |
| 0294490 | 12/1988 | European Pat. Off. . |
| 0336328 | 10/1989 | European Pat. Off. . |
| 0463575 | 1/1992 | European Pat. Off. . |
| 2591787 | 6/1987 | France . |

OTHER PUBLICATIONS

IBM Technical Disclosure Bulletin, vol. 29, No. 10, Mar. 1987, New York, N.Y., pp. 4297–4298.
Patent Abstracts of Japan, vol. 11, No. 2 (P–532), 6 Jan. 1987 & JP–A–61 180 935 (Matsushita Electric Ind. Co. Ltd.).
Ohba, et al., "Reflection Polarizing Holographic Optical Element for Compact Magnetooptical Disk Heads," vol. 29, No. 34, *Applied Optics*, Dec. 1, 1990, pp. 5131–5135.

*Primary Examiner*—W. R. Young
*Attorney, Agent, or Firm*—Limbach & Limbach; Philip M. Shaw, Jr.

[57] ABSTRACT

An optical recording/reproducing head device which includes a diffraction grating for splitting a light beam radiated from a light source into at least three light beams, an objective lens for converging the three light beams on a signal recording surface of a disc-shaped optical recording medium, driving means for driving the objective lens along a direction parallel to its optical axis and within a plane perpendicular to the optical axis, a beam splitter for splitting the light beam incident via the objective lens, a first photodetector having a light-receiving surface divided by two boundary lines into four sections, second and third photodetectors arrayed in a direction parallel to one of the boundary lines on both sides of the first photodetector and fourth and fifth photodetectors arrayed in a direction perpendicular to the one of the boundary lines on both sides of the first photodetector, a splitting optical element arranged between the photodetectors and the beam splitter for splitting each of the three light beams from the diffraction grating into three more light beams, and a focusing error detection optical element arranged between the photodetectors and the beam splitter, the focusing detection optical element causing changes in the shape of a spot on the light receiving surface of the first photodetector in accordance with displacement of the disc-shaped optical recording medium in a direction perpendicular to the in-plane direction of the disc-shaped optical recording medium.

2 Claims, 11 Drawing Sheets

U.S. PATENT DOCUMENTS

| | | | |
|---|---|---|---|
| 4,817,072 | 3/1989 | Toide et al. | 369/44.37 |
| 4,942,565 | 7/1990 | Lagadec | 369/59 |
| 4,951,274 | 8/1990 | Iwanaga et al. | 369/44.11 |
| 5,023,854 | 6/1991 | Satoh et al. | 369/32 |
| 5,042,020 | 8/1991 | Endo | 369/44.31 |
| 5,065,380 | 11/1991 | Yokota | 369/44.41 X |
| 5,138,592 | 8/1992 | Fujita | 369/44.37 X |
| 5,161,139 | 11/1992 | Inoue et al. | 369/44.23 |
| 5,257,253 | 10/1993 | Otsubo et al. | 369/48 |
| 5,268,886 | 12/1993 | Nagashima et al. | 369/44.41 |
| 5,270,996 | 12/1993 | Ono | 369/44.42 X |
| 5,272,693 | 12/1993 | Fujisawa | 369/291 |
| 5,276,665 | 1/1994 | Aoki et al. | 369/58 |
| 5,278,401 | 1/1994 | Takishima et al. | 250/201.5 |
| 5,281,802 | 1/1994 | Kitabayashi | 250/201.5 |
| 5,297,114 | 3/1994 | Itoh et al. | 369/44.23 |
| 5,349,175 | 9/1994 | Prikryl | 250/201.5 |

OPTICAL HEAD INCLUDING MULTIPLE PHOTO DETECTORS FOR READING SIGNALS AND ERROR SIGNALS FOR SERVOING FROM BOTH A READ-ONLY RECORDING MEDIUM AND A MAGNETO-OPTICAL RECORDING MEDIUM

This is a continuation application of application Ser. No. 08/253,672 filed on Jun. 3, 1994, now abandoned, which is a divisional application of prior application Ser. No. 08/122,012, filed Sep. 15, 1993 now pending.

BACKGROUND

1. Field of the Invention

The present invention relates to a recording and/or reproducing apparatus for a disc-shaped optical recording medium, and a photodetector and an optical head employed for the recording and/or reproducing apparatus. More particularly, the present invention relates to a recording and/or reproducing apparatus for a disc-shaped optical recording medium, which may be a read-only optical recording medium or a magneto-optical recording medium on which information signals may be re-recorded, and a photodetector and an optical head employed for the recording and/or reproducing apparatus.

2. Background of the Invention

The optical recording medium on or from which information signals are recorded or reproduced by a light beam, referred to hereinafter as an optical disc, may be classified into a read-only optical disc, known as a so-called compact disc, and a re-recordable optical disc which permits not only recording but also recording and erasure of information signals.

With the read-only optical disc, a pattern of microirregularities carrying information signals is formed on a concentric or spirally extending recording track(s) on one surface of the disc. Specifically, the optical disc includes a disc-shaped substrate, a reflective layer and a protective layer. The disc-shaped substrate is formed of a light-transmitting synthetic material, such as polycarbonate or PMMA. The reflective layer of a metal, such as Al or Au, for covering phase pits as the pattern of the microirregularities on one of the surfaces of the disc, substrate. The protective layer for covering and protecting the reflective layer.

As the re-recordable optical disc, there are presently known an optical disc formed of a phase-change type optical recording material and a magneto-optical disc formed of a vertical magnetic recording magnetic material. In general, the latter disc, that is the magneto-optical disc, has found practical application.

The magneto-optical disc has a disc-shaped substrate, a recording layer, and a protective layer. The disc-shaped substrate is formed of a light-transmitting synthetic material, such as polycarbonate or PMMA and forming a guide groove for guiding the light beam on its one surface. The recording layer is formed of a vertical magnetic recording material, such as Te, Fe or Co, for covering the guide groove. The protective layer covers and protects the recording layer.

For reproducing the former disc of these optical discs, that is the read-only optical disc, a light beam radiated from a laser light source is irradiated to the disc substrate after being converged by an objective lens. The light beam reflected by the reflective layer is received by a photodetector through the objective lens. The readout signals of the information signals recorded on the read-only optical disc may be produced by taking advantage of the diffraction by the phase pits of the optical disc of the light beam reflected back by the reflective layer on the optical disc.

With the latter disc, that is the re-recordable disc, above all, the magneto-optical disc, a light beam radiated from a laser light source is irradiated to the disc substrate after being converged by an objective lens, as in the read-only disc mentioned above. The light beam reflected by the recording layer is received by a photodetector through the objective lens. The readout signals of the information signals recorded on the magneto-optical disc may be reproduced by detecting the Kerr rotation angle in the light beam reflected by the recording layer of the magneto-optical disc.

The arrangement of a conventional optical head for reproducing information signals from the magneto-optical disc includes an optical head 105 made up of a semiconductor laser 101, an objective lens 102 and first and second photodetectors 103, 104, as shown in FIG. 1. The optical head 105, arranged as a unit, is movable along the radius of a magneto-optical disc 106.

A light beam L radiated from the semiconductor laser 101 is collimated by a collimator lens 107 so as to be incident on a diffraction grating 108. The light beam L, divided into at least three beams, is transmitted through a boundary plane 109a of a beam splitter 109 and thence directed to the object lens 102. The objective lens 102 causes the three beams divided from the light beam L incident thereon to be converged and radiated on the recording layer of the magneto-optical disc 106. A central one of the three beams divided from the light bee L is radiated on the center region of the recording track on the magneto-optical disc 106. The remaining two side beams are disposed on both sides of the center light beam and irradiated on the guide groove. The light beam L radiated on the center region of the recording track has its plane of polarization rotated responsive to the pattern of magnetization of the vertical magnetic recording layer on the recording track. The light beam L radiated on the guide groove is modulated depending on the edge of the guide groove.

Three reflected light beam Lr reflected by the magneto-optical disc 106 are incident on the beam splitter 109 via the objective lens 102 and reflected at the boundary plane 109a. The three reflected light beam Lr, reflected by the boundary plane 109a, undergo total reflection at a reflective surface 109b, formed at an end of the beam splitter 109, and has its direction of polarization rotated by 45° by a downstream side a half-wave plate 110.

The reflected light beam Lr transmitted through the half-wave plate 110 are incident on a polarization beam splitter 113 of an analyzer via a multiple lens 112 made up of a converging lens 111, a concave lens and a cylindrical lens. The three reflected light beam Lr incident on the polarization beam splitter 113, having a P-polarization component, are transmitted through the boundary plane 113a so as to be incident on a first photodetector 103. Three reflected light beam having an S-polarization component are reflected by the boundary plane 109a so as to be incident on a second photodetector 104. The multiple lens 112 plays the role of adjusting the focal distance of the reflected light beams Lr incident on the first and second photodetectors 103, 104 and for producing astigmatism.

The first photodetector 103 is made up of plural photodetectors, that is a central four-segment photodetectors A, B, C, D and two-segment photodetectors E, F and G, H on both sides of the photodetectors A to D, with the division lines of the photodetectors E, F and G, H extending radially of the optical disc. The second photodetector unit 104 includes a four-segment photodetectors a, b, c and d. Outputs of the photodetectors are supplied to a processing circuit, not shown.

The processing circuit calculates readout an information signal Si corresponding to information signals recorded on the magneto-optical disc 106, a focusing error signal Sf and a tracking error signal St in accordance with the equations (1)

$$Si=(A+B+C+D)-(a+b+c+d)$$
$$Sf=(A+C)-(B+D) \qquad (1)$$
$$St=[(A+D)-(B+C)]-K[(E-F)-(G-H)]$$

Of these signals, the readout the information signal Si is supplied to a downstream side signal processing circuit, not shown, and the two error signals Sf and St are supplied to an actuator 114.

The focusing error signal Sf is based on the so-called astigmatic method, whereas the tracking error signal St is based on the push-pull principle. As for the astigmatic method and the push-pull method, reference is had to e.g. the U.S. Pat. Nos. 4,023,033 and 3,909,608, respectively.

The actuator 114 has a magnetic circuit including a focusing coil, a tracking coil and a magnet. The objective lens 102 is moved towards and away from the magneto-optical disc 106, based on the focusing error signal Sf supplied to the magnetic circuit, for adjusting the focal point of the objective lens 102. Also, the objective lens 102 is moved along the radius of the magneto-optical disc, based on the tracking error signal St supplied to the magnetic circuit, for causing the light beam L from the semiconductor laser 101 to follow the track center.

Meanwhile, it is difficult as a principle to reproduce the read-only optical disc and the magneto-optical disc by one and the same optical head because these discs are reproduced in accordance with different playback principles. If reproducing signals are to be produced from the read-only optical disc by an optical head for the magneto-optical disc shown in FIG. 1, it may be contemplated to produce the readout signals using one of the first photodetector 103, such as the second photodetector 104.

However, with the conventional optical head, shown in FIG. 1, the two photodetectors 103, 104 need to be arranged at an angle of 90° with respect to each other, thus imposing limitation on the reduction in size of the optical head.

SUMMARY OF THE INVENTION

It is an object of the present invention to provide a recording and/or reproducing apparatus for a disc-shaped recording medium, which is free of the above-mentioned problems.

It is another object of the present invention to provide a recording and/or reproducing apparatus for a disc-shaped recording medium in which reproducing signals of both the read-only optical recording medium and the magneto-optical recording medium and servo error signals may be derived by a single photodetector unit.

It is further another object of the present invention to provide a photodetector unit and an optical head by means of which reproducing signals of both the read-only optical recording medium and the magneto-optical recording medium and servo error signals may be derived.

The present invention provides an optical head device movable along the radius of a disc-shaped optical recording medium and adapted for recording and/or reproducing information signals on or from the disc-shaped optical recording medium via a light beam. The diffraction grating lattice is arranged on a light path of the light radiated from the light source for splitting the light beam radiated from the light source into at least three light beams. The objective lens condenses the light beam radiated from the light source via the diffraction grating on the signal recording surface of the disc-shaped optical recording medium. The driving mechanism drives the objective lens in a direction along its optical axis and in a plane perpendicular to the optical axis. The beam splitter splits the light beam incident via the objective lens from the light beam radiated from the light source. The photodetector unit includes a first photodetector having a light-receiving surface divided by two boundary lines into four sections, second and third photodetectors arrayed in a direction parallel to one of said boundary lines on both sides of the first photodetector and fourth and fifth photodetectors arrayed in a direction perpendicular to the one of the boundary lines on both sides of the first photodetector. The splitting optical element is arranged between the photodetector unit and the beam splitter on an optical axis of a light beam incident via the objective lens for splitting each of the three light beams from the diffraction grating into three light beams. The splitting optical element is arranged between the photodetector unit and the beam splitter on an optical axis of a light beam incident via the objective lens for splitting each of the three light beams from the diffraction grating into three light beams.

It is possible with the recording and/or reproducing apparatus for the disc-shaped optical recording medium according to the present invention to recover reproduce signals and error signals for servo from the read-only optical recording medium and from the magneto-optical recording medium.

It is also possible with the recording and/or reproducing apparatus for the disc-shaped optical recording medium according to the present invention to recover reproduce signals and error signals for servo for the read-only optical recording medium and from the magneto-optical recording medium by a single photodetector to reduce the size of the apparatus.

Finally, it is possible with the optical head device of the present invention to recover reproduce signals and error signals for servo from the read-only optical recording medium and from the magneto-optical recording medium by a single photodetector to reduce the size of the optical system and the number of assembly process steps.

Other objects and advantages of the present invention will become apparent from the following description of the preferred embodiments and the claims.

BRIEF DESCRIPTION OF THE DRAWINGS

The invention will be more readily understood with reference to the accompanying drawing, wherein.

DESCRIPTION OF THE INVENTION

An example in which the recording and/or reproducing apparatus for a disc-shaped recording medium according to the present invention is applied to a recording and/or reproducing apparatus for both the read-only optical disc and the magneto-optical disc is hereinafter explained by referring to FIGS. 2 to 13. However, the disc cartridge employed in the recording and/or reproducing apparatus is first explained by referring to FIGS. 2 to 4.

Figure 1:
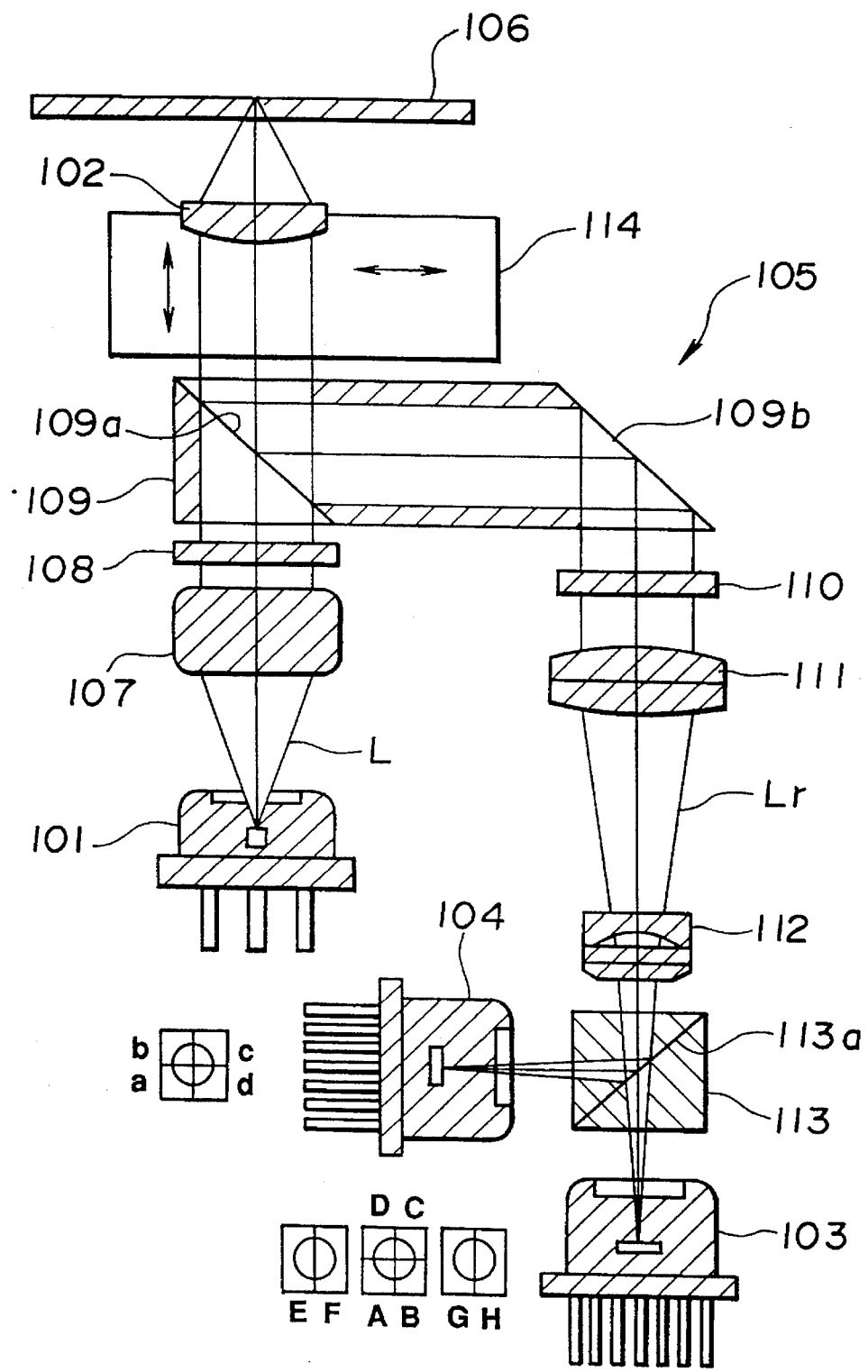
FIG. 1 shows an arrangement of an optical system of an optical head employed in a recording and/or reproducing apparatus according to the-background art.
Figure 2A:
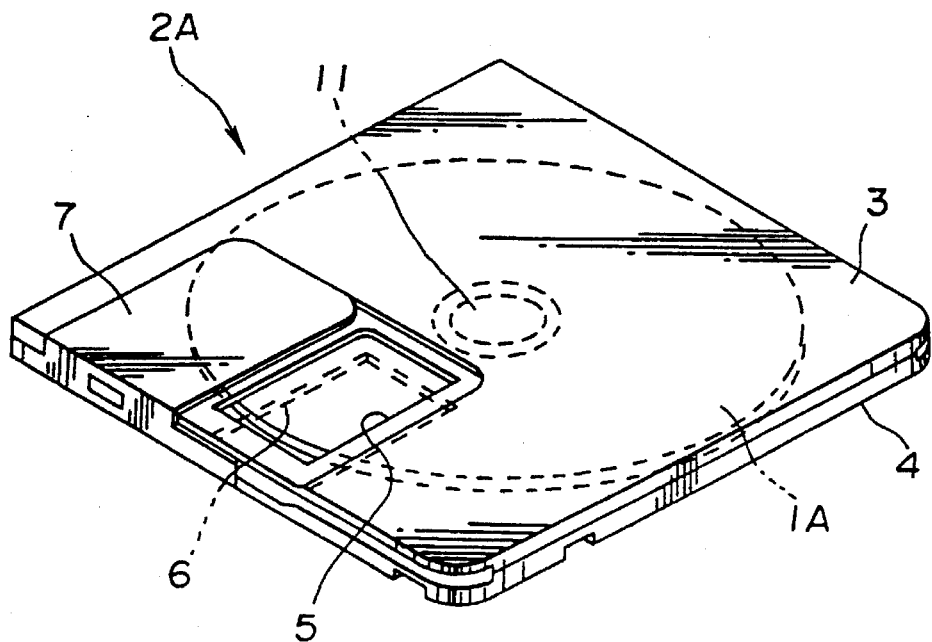
FIG. 2A is a perspective view, as seen from an upper side, showing a first disc cartridge employed in the recording and/or reproducing apparatus according to the present invention.
Figure 2B:
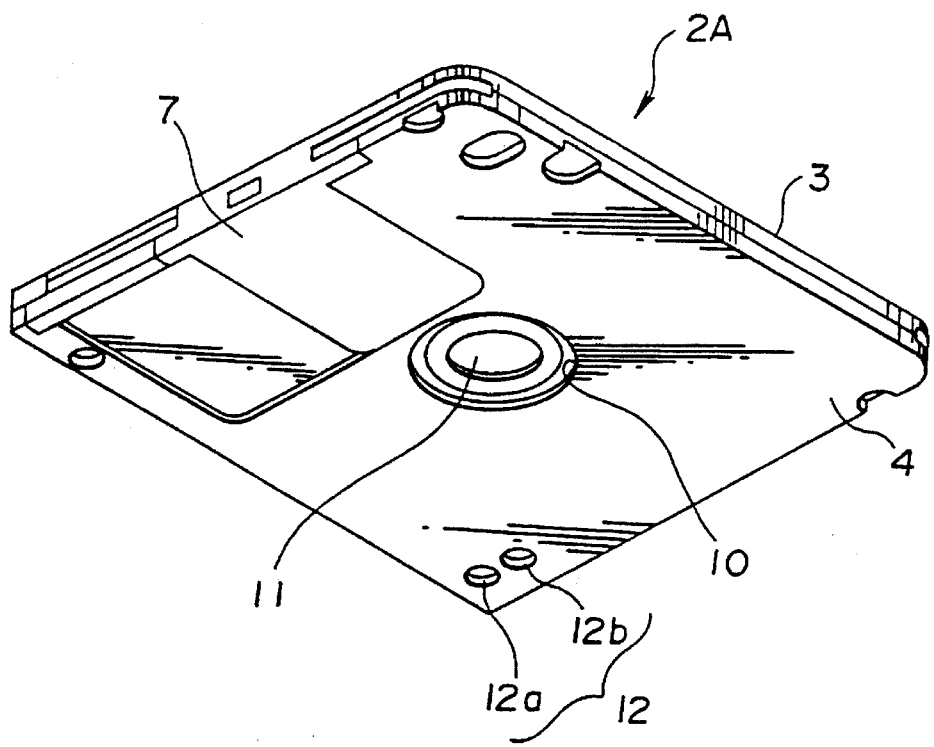
FIG. 2B is a perspective view, as seen from the lower side, of the first disc cartridge shown in FIG. 2A.
Figure 4A:
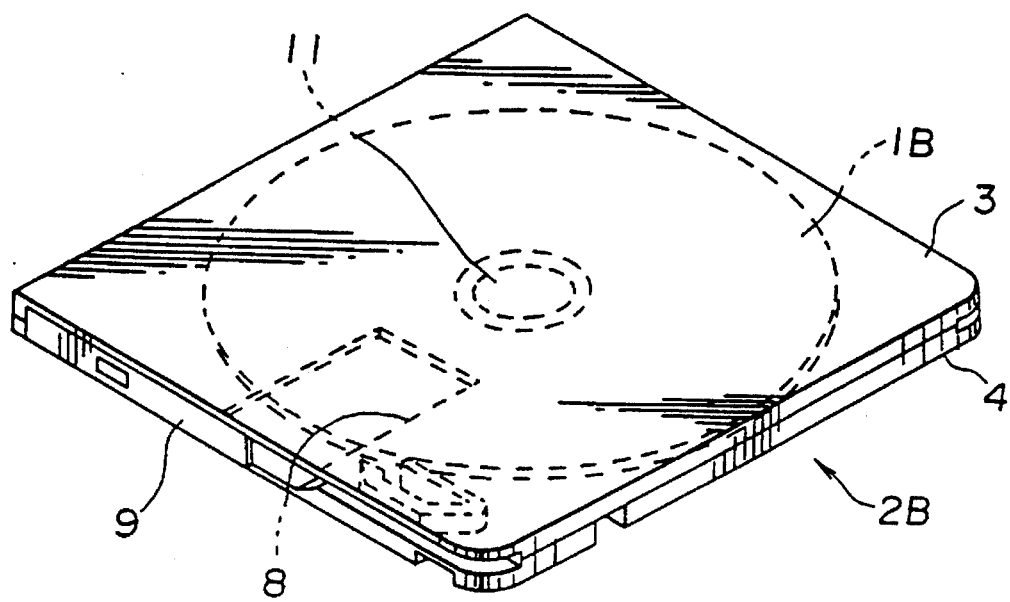
FIG. 4A is a perspective view, as seen from an upper side, showing a second disc cartridge employed in the recording and/or reproducing apparatus according to the present invention.
Figure 4B:
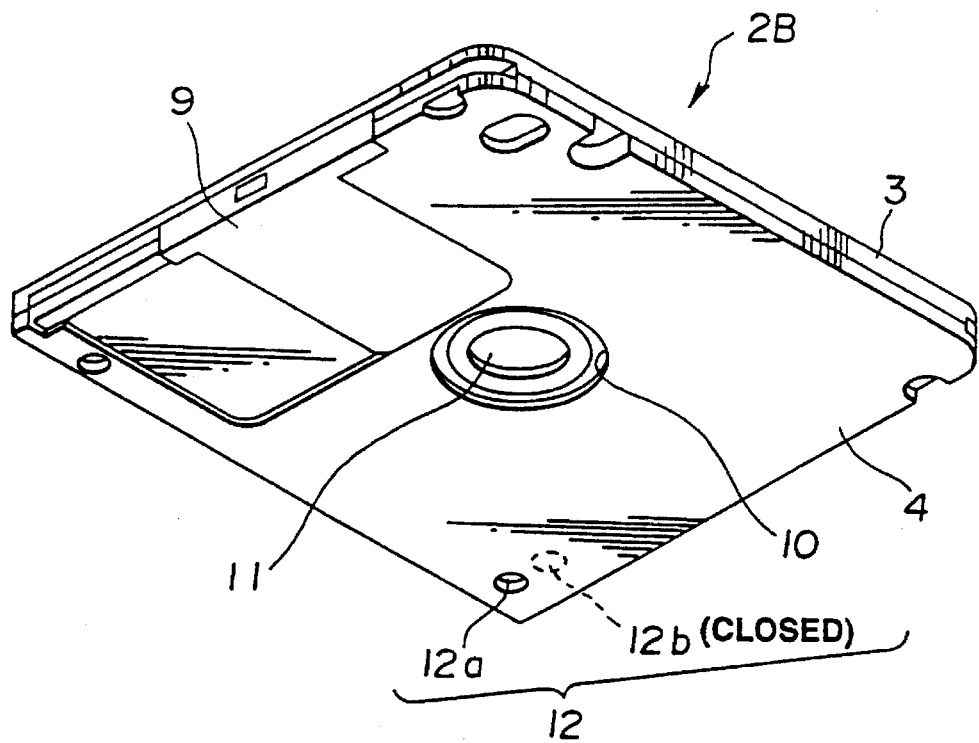
FIG. 4B is a perspective view, as seen from the lower side, of the second disc cartridge shown in FIG. 2A.

There are two different type disc cartridges which may be employed, that is, a first disc cartridge 2A rotatably accommodated in a magneto-optical disc 1A, as shown in FIG. 2, and a second disc cartridge 2B rotatably contained in a read-only optical disc 1B rotatably contained therein, as shown in FIG. 4. The disc cartridges 2A and 2B are each includes of box-shaped upper and lower halves 3, 4 of reduced thicknesses which are bonded to each other, such as with an adhesive, with open sides thereof facing each other, as shown in FIGS. 2 and 4.

The first disc cartridge 2A has apertures 5, 6 on its front and back sides and a shutter 7 of a U-shaped cross-section for selectively opening and closing the apertures 5, 6. On the other hand, the second disc cartridge 2B has an aperture 8 only in its back surface, that is on the front surface of the lower half 4, as shown in FIG. 4. The second disc cartridge 2B is provided with a shutter 9 only on its back surface which may be slid for selectively opening and closing the aperture 8. For convenience in explanation, the magneto-optical disc 1A and the read-only optical disc 1B are collectively termed a disc 1, while the first and second disc cartridges 2A and 2B are collectively termed a disc cartridge 2.

Each of the disc cartridges 2A and 2B is formed with a circular through-hole 10 at a center of the back side thereof and a center hub 11 of each of the magneto-optical disc 1A and the read-only optical disc 1B is passed through the through-hole 10.

A discriminating device 12 is provided on the back side corner parts of the first and second disc cartridges 2A and 2B opposite to the corners of a region provided with the apertures 6 and 8. The discriminating device 12 are made up of a discriminating through-hole 12a for inhibiting mistaken erasure and a discriminating through-hole 12b for discriminating the disc type. The discriminating through-holes 12a, 12b are circular in contour and are disposed in proximity to each other.

Figure 3:
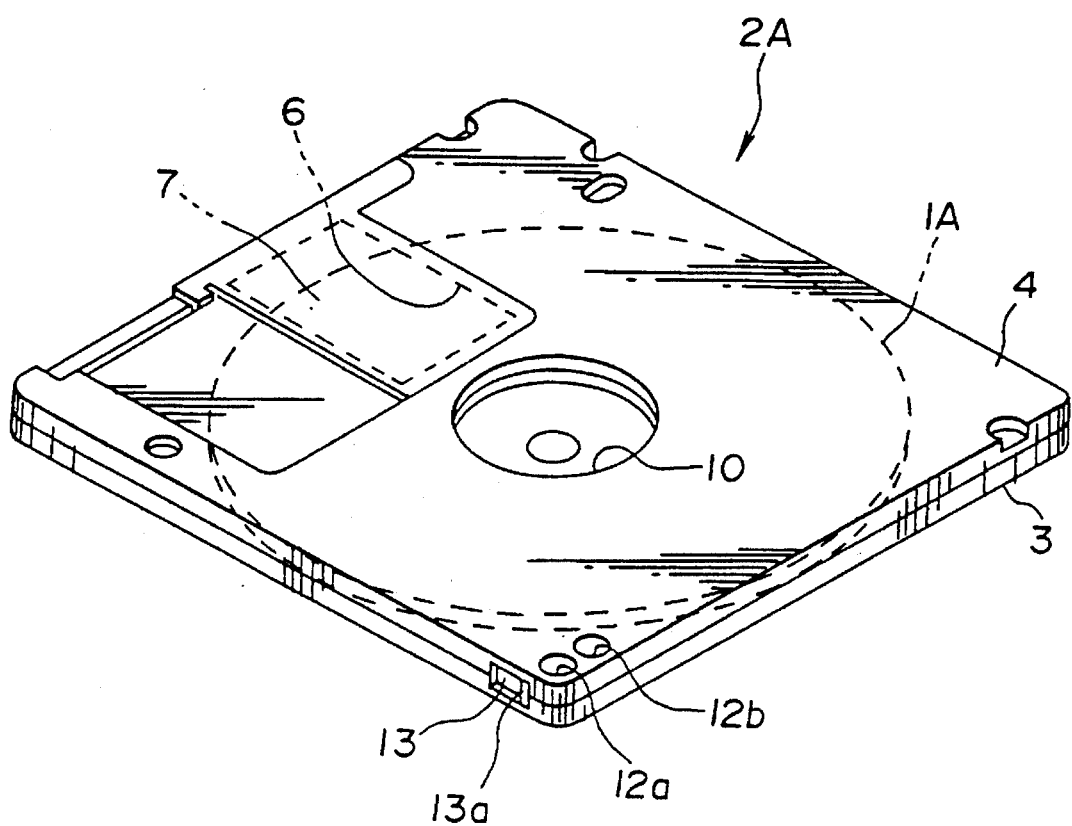
FIG. 3 is a perspective view, as seen from the lower side and the back side, of the first disc cartridge shown in FIG. 2A.

Referring to the first disc cartridge 2A, the discriminating through-hole 12a for inhibiting mistaken erasure is selectively, opened or closed by an operating member 13 provided on a lateral side of the first disc cartridge 2A, as shown in FIG. 3. The opening or closure of the discriminating through-hole 12a is detected by a detection unit of the recording and/or reproducing apparatus and a decision is made as to whether or not recording may be made on the magneto-optical disc 1A contained in the disc cartridge 2A.

The operating member 13 is an operating member partially exposed to outside via a rectangular opening in the lateral surface of the disc cartridge 2A and a closure portion integral with the operating member 13. The closure portion is adapted for selectively closing the discriminating through-hole 12a. The discriminating through-hole 12a may be selectively opened or closed by sliding a boss 13a formed on the exposed portion of the operating member 13 along the longitudinal lateral side of the disc cartridge 2A.

The opening or closure of the discriminating through-hole 12a by the operating member 13 may be made optionally by the user depending on the manner of using the disc cartridge 2A or may also be preset at the manufacturing plant. When the operating member 13 is set the plant for closing the discriminating through-hole 12a, the magneto-optical disc 1A within the first disc cartridge 2A is set as the read-only magneto-optical disc. In order to prevent the user from erroneously recording data on the read-only magneto-optical disc, the operating member 13 is secured with an adhesive to the disc cartridge 2A, with the closure portion of the operating member 13 closing the through-hole 12a to render it difficult to release the closed state of the through-hole 12a.

On the other hand, the discriminating through-hole 12b for disc type discriminates reflectivity of the disc 1 contained in the disc cartridge 2 by the opening or closure thereof.

For example, the disc cartridge 2 containing a disc 1 of low reflectivity, such as a magneto-optical disc 1A, has the discriminating through-hole 12b opened, whereas the disc cartridge 2 containing a disc 1 of high reflectivity, such as a read-only optical disc 1B, has the discriminating through-hole 12b closed. The magneto-optical disc 1A or the read-only optical disc 1B is contained within the disc cartridge 2 during the manufacture process of the disc cartridge 2. Therefore, in distinction from the discriminating through-hole 12a for preventing mistaken erasure, the discriminating through-hole 12b is not to be opened selectively by the user. Consequently, the discriminating through-hole 12b is opened or closed during the manufacture process of the disc cartridge 2. In the simplest case, it suffices to form the through-hole 12b only in the first disc cartridge 2A containing the low reflectivity disc 1, such as the magneto-optical disc 1A.

Figure 5:
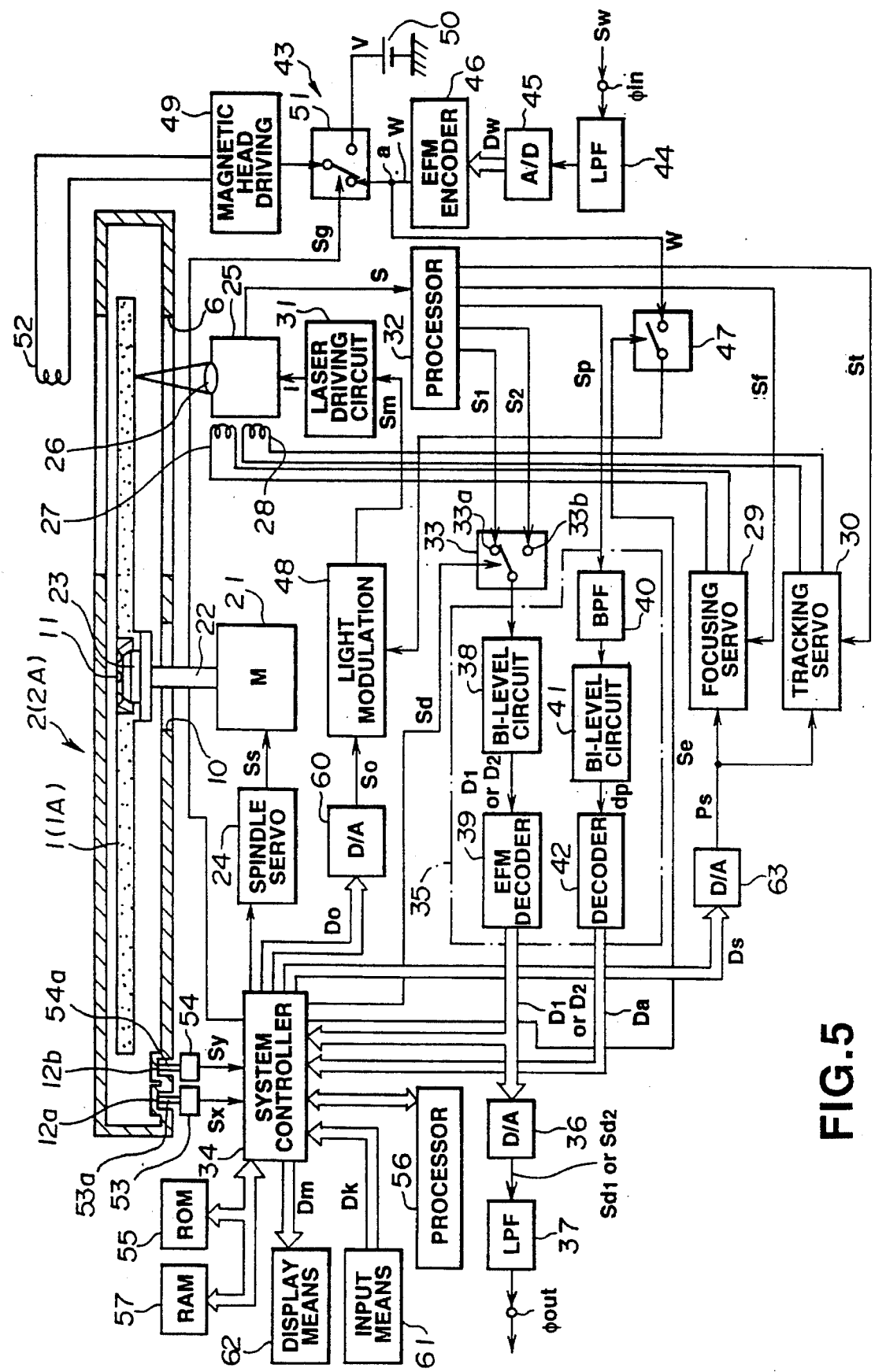
FIG. 5 is a block circuit diagram showing an embodiment in which the recording and/or reproducing apparatus for the disc-shaped recording medium according to the present invention is applied to a recording and/or reproducing apparatus for both the read-only optical disc and the magneto-optical disc.

The schematic arrangement of the recording and/or reproducing apparatus of the present embodiment, into which the first disc cartridge 2A or the second disc cartridge 2B is loaded selectively, and an arrangement of an optical head loaded on the recording and/or reproducing apparatus, will be explained by referring to FIGS. 5 to 13. In the following explanation of the recording and/or reproducing apparatus, the state in which the first disc cartridge 2A is loaded therein is mainly explained as an illustrative case. Besides, for convenience in explanation, the relative position of the through-holes 12a and 12b formed in the first disc cartridge 2 in FIG. 5 is different from the relative position of the through-holes 12a and 12b shown in FIG. 3.

The recording and/or reproducing apparatus includes a cartridge holder, not shown, into which the first and second disc cartridges 2A and 2B are introduced selectively. A shutter opening/closing mechanism for opening or closing the shutters 7 and 9 of the first and second disc cartridges 2A and 2B in a manner known per se is provided within the cartridge holder. When the first disc cartridge 2A or the second disc cartridge 2B is introduced into the cartridge holder, the shutter 7 or 9 is opened by the shutter opening/closure mechanism. When the shutter 7 or 9 is opened completely, that is when the disc cartridge 2 is fully introduced into the cartridge holder, capturing of the disc cartridge 2 into the recording and/or reproducing apparatus is completed.

A spindle motor 21 for rotationally driving the magneto-optical disc or the read-only optical disc contained within the disc cartridge 2 is provided at a position below the aperture 10 in the disc cartridge 2 loaded in position within the recording and/or reproducing apparatus.

The spindle motor 21 may be moved vertically, that is in a direction towards and away from the disc cartridge 2, by a lift unit made up of a stepping motor and a rotation-linear motion translating mechanism in a manner known per se. A turntable 23 fitted with a permanent magnet is provided at an upper end of a shaft 22 of the spindle motor 21.

When the disc cartridge 2 is loaded in position, the spindle motor 21 is lifted and, by such lifting of the spindle motor 21, the turntable 23 is intruded into the disc cartridge 2 via the aperture 10 in the disc cartridge 2. At this time, the upper surface of the turntable 23 is kept in close contact with the center hub 11 of the disc 1 contained in the disc cartridge 2, under the magnetic attraction by the magnet, so that the disc 1 is held by the turntable 23. As a result thereof, the disc 1 contained in the disc cartridge 2 is loaded on the spindle motor 21. The spindle motor 21 is run in rotation by a constant angular velocity (CAV) or a constant linear velocity (CLV) based on a driving signal Ss from a spindle servo circuit 24. The loading operation of the disc cartridge 2 into the recording and/or reproducing apparatus is completed by the disc 1 contained in the disc cartridge 2 being held on the turntable 23.

An optical head 25 is provided within the disc cartridge 2 below the aperture 6 exposed in the apparatus. The optical head 25 is movable along the radius of the disc 1 within the disc cartridge 2 by a sliding mechanism, mainly consisting in a linear motor and a guide shaft, not shown.

The optical head 25 is provided with an objective lens 26 for converging the light beam from a laser light source on the disc 1. The objective lens 26 may be moved slightly both in a direction towards and away from the disc 1 and along the radius of the disc 1 by an actuator, not shown. The actuator has a magnetic circuit included of e.g. a focusing coil 27, a tracking coil 28 and a magnet, not shown.

Output signals of a focusing servo circuit 29 and a tracking servo circuit 30 are supplied to the coils 27 and 28, respectively. The objective lens 26 is moved by the actuator in a direction towards and away from the disc 1, under the force exerted by the coils 27, 28 and the magnet, not shown, for being adjusted as to its focal point, while being moved along the radius of the disc 1 for performing tracking adjustment.

The laser light source, supplied with a driving current i from a laser driving circuit 31, radiates a light beam in an amount proportional to an output (light volume) corresponding to the current level. A readout signal S, picked up by the optical head 25, is supplied to a downstream processing circuit 32 which is made up e.g. of an adder and a subtractor. The readout signal S is transmitted to the processing circuit 32 over several signal lines, which are represented by a single line in FIG. 5.

The processing circuit 32 outputs output signals $S_1$ and $S_2$ indicating the types of the information recorded on the disc 1, a focusing error signals Sf, a tracking error signal St and a push-pull signal Sp which is a signal used for obtaining an address information recorded on the disc 1.

That is, a pre-groove or guide groove is formed on the disc 1 with wobbling along the radius of the disc 1. The pre-groove is frequency-modulated on the basis of the address information. The address information on the disc 1 may be acquired by detecting the wobbling state of the pre-groove using the push-pull signal Sp. As for the technique of wobbling the groove based on the address information, reference is had to our copending JP Patent KOKAI Publication No. 63-87682 or U.S. Pat. No. 4,942,565.

The two types of the output signals $S_1$ and $S_2$ from the processing circuit 32 are supplied to a downstream side switching circuit 33. One of these output signals $S_1$ or $S_2$ is selected by the switching circuit 33 based on changeover signal Sd from a system controller 34. The output signal $S_1$ or $S_2$, selected by the switching circuit 33, and the push-pull signal Sp from the processing circuit 32, are supplied to a demodulating circuit 35 so as to be demodulated into digital data $D_1$ or $D_2$ and address data Da, respectively.

The digital data $D_1$ or $D_2$ of the demodulating circuit 35 is supplied to the system controller 34 and to a downstream side D/A converter 36, respectively. The digital data $D_1$ or $D_2$, supplied to the D/A converter 36, is converted into analog playback signals $Sd_1$ or $Sd_2$ which are outputted at output terminals out via a downstream side low-pass filter 37. The address data Da from the demodulating circuit 35 is supplied to the system controller 34.

The demodulating circuit 35 has a series connection of a binary circuit 38 and an EFM decoder 39 on a signal line traversed by the readout signal $S_1$ or $S_2$ and a series connection of a band-pass filter 40, a binary circuit 41 and a decoder 42 on a signal line traversed by the push-pull signal Sp. Thus the readout signal $S_1$ or $S_2$ is translated by the binary circuit 38 into series binary data $d_1$ or $d_2$ which then are supplied to the downstream side EFM decoder 39. The binary data $d_1$ or $d_2$ is processed by the EFM decoder 39 by decoding for error correction, such as parity appendage or interleaving or EFM decoding to produce digital data $D_1$ or $D_2$ which is outputted.

The push-pull signal Sp is processed by the band-pass filter 40 where only the signal of the carrier frequency component for frequency modulation is taken out. The frequency component is set to a frequency component associated with the pre-groove, such as 22.05 kHz ±900 Hz. The signal which has traversed the band-pass filter 40 is translated by the downstream side binary circuit 41 into series binary data dp which is decoded by the decoder 42 so as to be translated into address data Da corresponding to the pre-groove. Details of the optical head 25 and the processing circuit 32 will be discussed later.

A magneto-optical recording circuit 43 for recording information signals Sw on the magneto-optical disc 1A is loaded on the recording and/or reproducing apparatus. The recording circuit 43 is included a low-pass filter 44, an A/D converter 45 and an EFM encoder 46. The A/D converter 45 quantizes analog audio signals Sw entered via the low-pass filter 44 from an input terminal in for translation into digital audio data Dw. The digital audio signal Dw is supplied to the downstream side EFM encoder 46. The digital audio data Dw from the A/D converter 45 is processed by the EFM encoder 46 with encoding for error correction, such as parity appendage or interleaving and EFM encoding.

The recording data W from the EFM encoder 46 is supplied via a contact a and a switching circuit 47 to a light modulating circuit 48 connected at a pre-stage of the laser driving circuit 31 in the laser light source. Between the EFM encoder 46 and a magnetic head driving circuit 49, there is connected to a switching circuit 51 for selectively switching an input to the magnetic head driving circuit 49 to the recording data W from the EFM encoder 46 or to DC voltage V from a DC power source 50. If the loaded disc 1 is the magneto-optical disc 1A, and the recording system for the magneto-optical disc 1A is the light modulation system, the switching circuit 47 is turned on based on a switching signal Se from the system controller 34 for transmitting the recording data W from the EFM encoder 46 to the light modulation circuit 48 Simultaneously, the switching circuit 51 changes over the input to the magnetic head driving circuit 49 to the DC power source 50 based on a switching signal Sg from the system controller 34.

A magnetic head 52 is connected downstream of the magnetic head driving circuit 49 and generates a modulated vertical magnetic field or a DC vertical magnetic field. The magnetic head 52 and the optical head 25 are operatively associated with each other so as to be moved in the radial direction of the disc 1. The light modulating circuit 48 modulates a laser output signal So from the system controller 34 based on the recording data W. The bias voltage of the laser driving circuit 31 is changed depending on a modulated signal Sm from the light modulating circuit 48. Thus the output light intensity of the light beam radiated by the laser light source is changed depending on the recording data W. By the light bream modulated under a DC magnetic field environment being radiated on the magneto-optical disc 1A, data may be recorded on the magneto-optical disc 1A in accordance with the light modulation recording system.

On the other hand, if the loaded disc is the magneto-optical disc 1A, and the recording system for the magneto-optical disc 1A is the magnetic field modulating system, the switching circuit 49 sets the input to the magnetic head driving circuit 49 to the EFM encoder 46, based on the changeover signal Sg from the system controller 34, while the switching circuit 47 is turned off, based on the changeover signal Se from the system controller 34, for interrupting supply of the recording data W towards the light modulating circuit 48.

The magnetic head driving circuit 49 drives the magnetic head 52 for supplying the vertical magnetic field modulated in accordance with the supplied recording data W to the magneto-optical disc 1A. Since an input from the EFM encoder 46 is interrupted, the light modulation circuit 48 directly transmits the laser output signal So from the system controller 34 to the laser driving circuit 31 without modulation. As a result thereof, a light beam is radiated from the laser source at a DC power level required for recording. In such case, the vertical magnetic field supplied from the magnetic head 52 is modulated on the basis of the recording data W under the environment in which the light beam is radiated with a constant light intensity. As a result, data may be recorded on the magneto-optical disc 1A in accordance with the magnetic field modulation recording system.

Within the recording and/or reproducing apparatus, detection switches 53 and 54 are provided in register with the discrimination through-holes 12a, 12b formed in the disc cartridge 2. The detection switches 53, 54 are fitted with contacting members 53a, 54a which are protruded towards the discriminating through-holes 12a, 12b and which are perpetually biased by e.g. coil springs etc. in an upward direction, that is in a direction of being intruded into the discriminating through-holes 12a and 12b.

Therefore, if the disc cartridge 2 loaded into the cartridge holder is the first disc cartridge 2A, having the disc 1 of low reflectivity, such as the magneto-optical disc 1A, the discriminating through-hole 12b is opened, as shown in FIG. 5, so that the contacting member 54a of the detection switch 54 is protruded upwards and intruded into the discriminating through-hole 12b. At this time, an on-signal or a high-level signal is outputted from the detection switch 54 and transmitted to the system controller 34.

Figure 6:
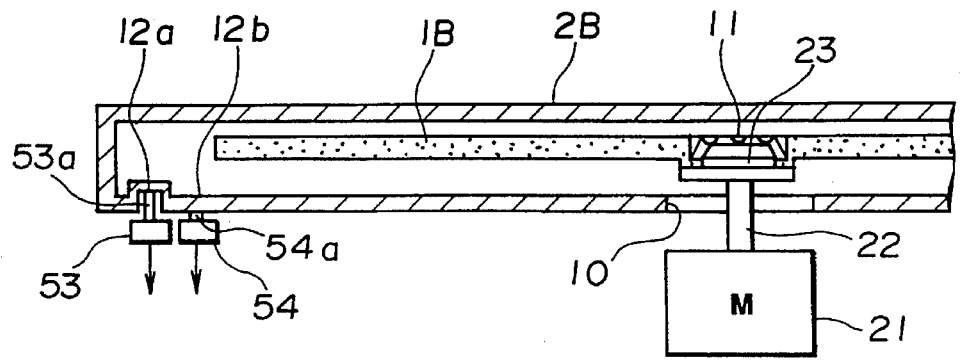
FIG. 6 is a schematic cross-sectional view showing a read-only optical disc loaded on a spindle motor of a recording and/or reproducing apparatus according to the present invention.

On the other hand, if the disc cartridge 2 is the second disc cartridge 2B, having the disc 1 of high reflectivity, such as the read-only optical disc 1B, the discriminating through-hole 12b is closed, as shown in FIG. 6, so that the contacting member 54a of the detection switch 54 is thrust downwards against the bias of the coil spring. At this time, an off-signal or a low-level signal is outputted from the detection switch 54 and transmitted to the system controller 34.

Another detection switch 53 detects whether or not recording may be made on the disc 1 contained in the loaded disc cartridge 2. When the discriminating through-hole 12a is opened, the contacting member 53a of the detection switch 53 is protruded upwards into the discriminating through-hole 12a. At this time, the detection switch 53 outputs an on-signal, such as a high-level signal. When the discriminating through-hole 12a is closed, the contacting member 53a is thrust downwards, at which time the detection switch 53 outputs an off-signal (low-level signal).

The on-signal and off-signal from the detection switch 53 are supplied to the system controller 34. The discrimination as to whether or not the disc 1 is recordable may be made electrically from the on-signal and the off-signal from the detection switch 53 as indicating recordable or unrecordable, respectively. The mode of discrimination may naturally be reversed from that given above.

The system controller 34 is operated in accordance with the algorithm written in a ROM 55 for causing input data to be processed by a processing unit 56 to store the processing results or causing control signals to be outputted to various circuits based on the processing results to control various circuits. The signal processing and control operations by the system controller 34 will be explained subsequently.

Figure 7:
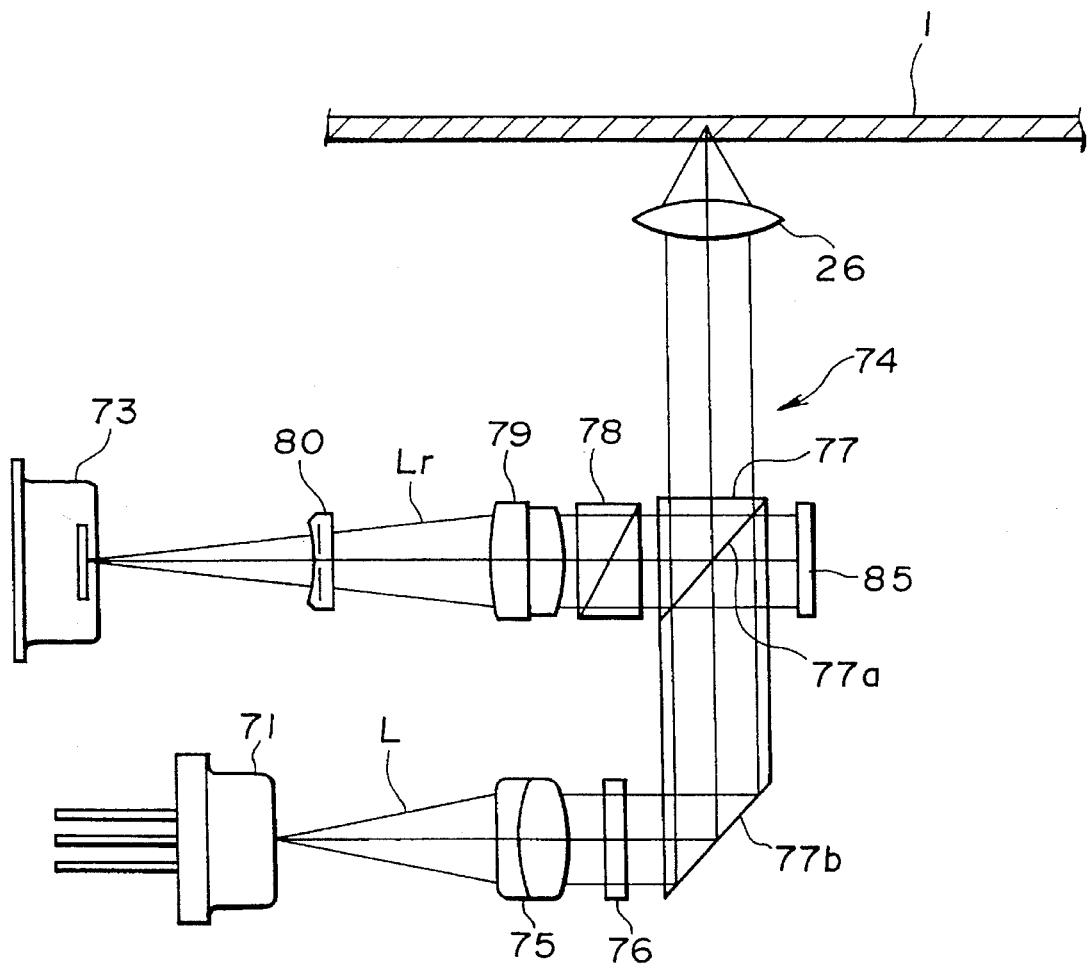
FIG. 7 is a schematic view showing above all an optical system of an optical head loaded on a recording and/or reproducing apparatus according to the present invention.

The optical head of the recording and/or reproducing apparatus according to the present embodiment is explained by referring to FIG. 7. The optical head has an optical system 74 including a laser light source 71 consisting of a semiconductor laser of the light beam L, the objective lens 26 for converging the light beam L on the disc 1 and a photodetector 73 for detecting the return light beam Lr reflected from the disc 1 for translating the return light beam into an electrical signal as detection signal proportional to the reflected light intensity, as shown in FIG. 7. The optical head is constructed as a unit and adapted for being moved along the radius of the disc 1 by well-known movement device, such as a linear motor.

The optical system 74 includes, besides the above-mentioned optical components, a collimator lens 75, a diffraction grating 76, a beam splitter 77 and a Wollaston prism 78. The collimator lens 75 translates the light beam L radiated from the laser light source 71 into a collimated light. The diffraction grating 76 divides the light beam L into at least three beams. The beam splitter 77 splits the light beam L from the laser light source 71 from the return light beam Lr from the disc 1. The prism 78 is arranged on a light path of the return light beam Lr between the beam splitter 77 and the photodetector 73 for splitting the return light beam into three light beams. A total reflection plane 77b is formed on the end face of the beam splitter 77 for conducting the light beam L from the laser light source 71 towards a boundary plane 77a.

A converging lens 79 for converging the return light beam Lr on the photodetector 73 and a multi-lens 80 made up of a cylindrical lens and a concave lens for adjusting the focal distance of the return light beam Lr and for generating astigmatism are arranged between the Wollaston prism 78 and the photodetector 73.

A light receiving element 81 as a photodetector for detecting a part of the light beam L from the laser light source 71, that is the light component reflected at the boundary plane 77a of the beam splitter 77, for translating the detected light into an electrical detection signal of an output current or voltage level corresponding to the volume of the reflected light beam, is provided on the side of the beam splitter 77 opposite to the photodetector 73.

A detection signal from the light receiving element 85 is supplied to an automatic power controlling circuit, not shown. The automatic power controlling circuit controls the output of the laser light source 71 based on the detection signal from the light receiving element 85 so that the light intensity of the light beam L from the laser light source 71 will be constant.

The operation of the optical head 25 is explained. The light beam L radiated from the laser light source 71 is collimated by the collimator lens 75 before being incident on the diffraction grating 76. The light beam L is divided by the diffraction grating 76 into at least three light beam, that is the 0th order light, +1st order light and −1st order light. These light beams are transmitted through the boundary plane 77a of the beam splitter 77 so as to be supplied to the objective lens 26.

The objective lens 26 converges and radiates the three light beams divided from the light beam L on the disc 1. Of these three light beams, the center one (0th order light) is radiated on the center of a recording track on the disc 1, while the remaining two light beams (±1st order lights) are radiated on the guide groove so as to lie ahead and behind of the center light beam.

In the case of the read-only optical disc 1B, the light beam L radiated on the center of the recording track is modulated in accordance with phase pits formed along the recording track. If the disc 1 is the magneto-optical disc 1A, the light beam L radiated on the center of the recording track has its plane of polarization rotated in accordance with the pattern of magnetization of the recording layer on the recording track. On the other hand, the light beam L radiated on the guide groove is modulated in accordance with the edges of the guide groove for both the read-only optical disc 1B and the magneto-optical disc 1A.

The three return light beams Lr reflected by the disc 1 are incident via the objective lens 26 on the beam splitter 77 so as to be then reflected by its boundary plane 77a. The three return light beams Lr are incident on the downstream side Wollaston prism 78.

The Wollaston prism 78 splits each of the three return light beams Lr incident thereon in a direction intersecting the splitting direction by the diffraction grating 76. In this manner, a sum of nine return light beams Lr are radiated from the Wollaston prism 78. These nine return light beams Lr are converged by a next-stage converging lens 79 and caused to be incident on the photodetector 73 via the multi-lens 80. The nine return light beams Lr are caused to be incident on the photodetector 73 in a state in which beam spots on the photodetector 73 are arrayed in a square pattern. As for the Wollaston prism 78, reference is had to U.S. Pat. No. 4,771,414.

Figure 8:
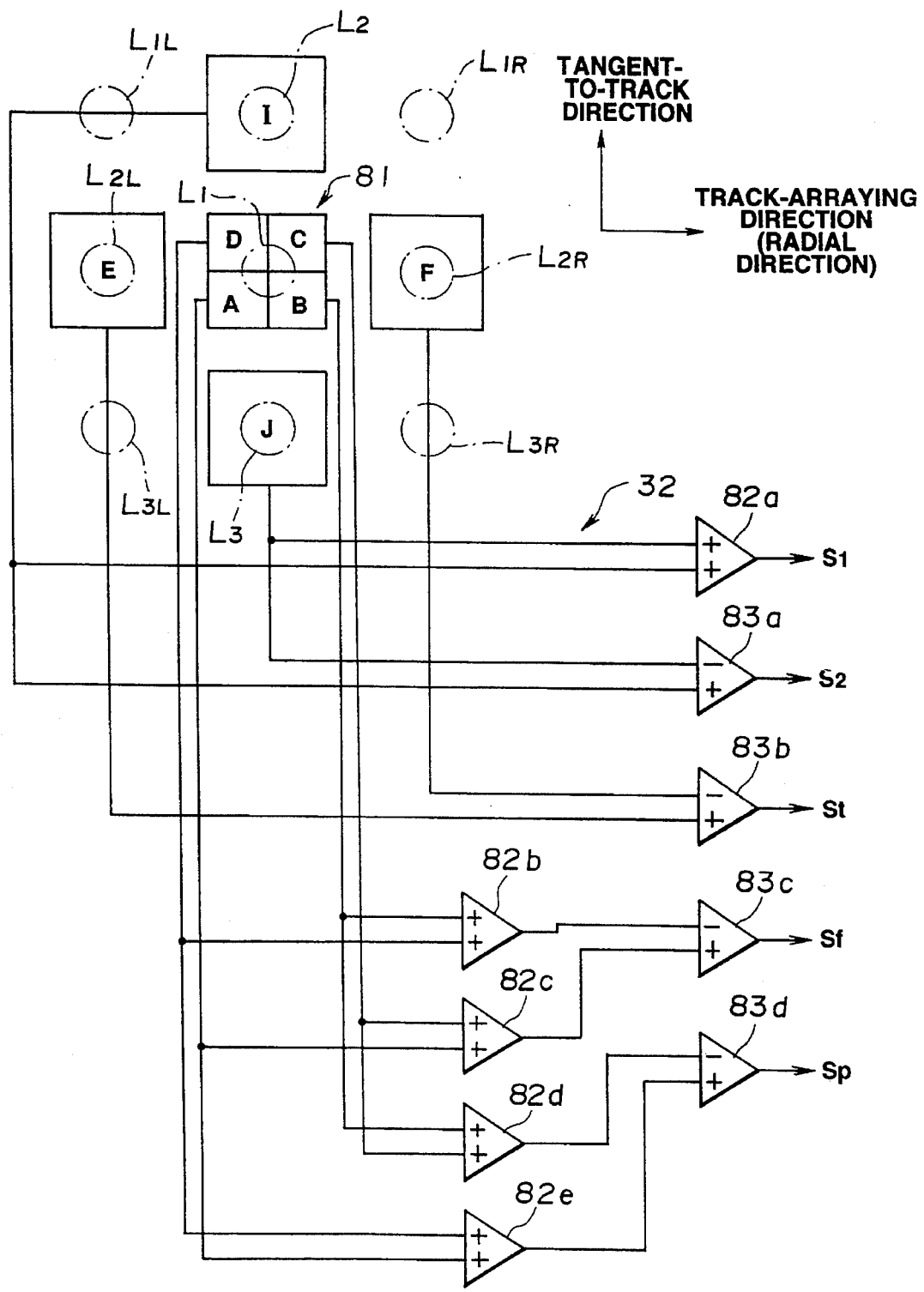
FIG. 8 is a schematic view showing the construction of a photodetector provided on an optical head according to the present invention, as well as an arrangement of a processing circuit.

An illustrative example of the photodetector 73 is explained by referring to FIG. 8. The photodetector 73 includes an array of light-receiving domains, each consisting in a PN junction, on a single semiconductor substrate. Concretely, the photodetector 73 has a central four-segment detector 81 made up of four light-receiving elements A, B, C and D, each having a small light-receiving area, arrayed in a square pattern. First and second light-receiving elements I and J are arrayed above and below the four-segment detector 81 as viewed in the drawing, respectively. Third and fourth light-receiving elements E and F are arrayed on the left and right sides of the four-segment detector 81 as viewed in the drawing, respectively. These light-receiving elements are separated from one another by a field insulating film prepared by selective oxidation (LOCOS) method by an element separating zone by a trench construction. The substrate on which these light-receiving elements are arrayed is arranged so as to be perpendicular with respect to an optical axis of the return light beam Lr.

As for the disposition of these light-receiving elements with respect to the track-arraying direction (radial direction) of disc 1 and the direction tangential to the track, the central four-segment detector 81 is arranged substantially at the track center, while the first and second light-receiving elements I and J are arrayed along the tangent to the track and the third and fourth light-receiving elements E and F are arrayed along the track-arraying direction.

Of the nine return light beams Lr, the center return beam $L_1$ is received by the four-segment detector 81. The return light beam $L_2$, which is split by the first light-receiving element I, and which is composed of an S-polarized light component, is received by the second light-receiving element J. Of the three return light beams $L_{1L}$, $L_{2L}$ and $L_{3L}$, disposed on the left side of the centrally disposed three return light beams $L_1$ to $L_3$, the centrally disposed return light beam $L_{2L}$ is received by the third light-receiving element E. On the other hand of the three return light beams $L_{1R}$, $L_{2R}$ and $L_{3R}$, disposed on the left side of the centrally disposed three return light beams $L_1$ to $L_3$, the centrally disposed return light beam $L_{2R}$ is received by the fourth light-receiving element F.

The detection signals from the four-segment detector 81, first and second light-receiving elements I and J and the third and fourth light-receiving elements E and F are supplied to the processing circuit 32 made up of a plurality of, herein five, addition circuits 82a to 82e, and a plurality of, herein four, subtractive circuits 83a to 83d.

The detection signals from the first and second light-receiving elements I, J are supplied to the first additive circuit 82a. The detection signals from the light-receiving elements B, D of the four-segment detector 81 are supplied to the second additive circuit 82b, while detection signals from the light-receiving elements A, C of the four-segment detector 81 are supplied to the third additive circuit 82c. The detection signals from the light-receiving elements B, C are supplied to the fourth additive circuit 82d. The detection signals from the light-receiving elements A, D of the four-segment detector 81 are supplied to the fifth additive circuit. Signal lines from the respective light-receiving elements are connected in this manner to the respective light-receiving elements.

The detection signals from the first and second light-receiving elements I and J are supplied to the first subtractive circuit 83a. The detection signals from the third and fourth light-receiving elements E and F are supplied to the second subtractive circuit 83b. The addition signals from the second and third additive circuits 82b and 82c are supplied to the second subtractive circuit 83c. The addition signals from the fourth and fifth additive circuits are inputted to the fourth subtractive circuit. Signal lines from the respective light-receiving elements are connected in this manner to the respective subtractive elements.

The output signals of the first additive circuit 82a and the first to fourth subtractive circuits 83a to 83d are related with one another by the following equations (2). That is, the output signal of the first additive circuit 82a becomes a first readout signal $S_1$, the output signal of the first subtractive circuit 83a becomes a second readout signal $S_2$, the output signal of the second subtractive circuit 83b becomes a tracking error signal St, the output signal of the third subtractive circuit 83c becomes a focusing error signal Sf and the output signal of the fourth subtractive circuit 83d becomes a push-pull signal Sp.

$$S_1 = I + J$$

$$S_2 = I - J$$

$$St = E - F \quad (2)$$

$$Sf = (A + C) - (B + D)$$

$$Sp = (A + D) - (B + C)$$

It should be noted that, in the present embodiment, the multi-lens 80 is arrayed between the converging lens 79 and the photodetector 73 and, as the objective lens 26 is deflected towards the direction perpendicular to the in-plane direction of the disc 1, the spot radiated on the light-receiving area of each of the light-receiving elements A to D of the four-segment detector 81 is changed in profile. As a result thereof, the focusing error signal Sf may be produced accurately by the processing by the processing circuit 32.

If the light modulation in the return light beam Lr incident on the photodetector 73 has been brought about by the phase pit in the disc 1, the signal associated with the presence or absence of the phase pit may be directly utilized as the reproducing signal. That is, the light intensity of the return light beam is detected and an electrical signal corresponding to the light intensity (current or voltage level) may be directly employed as the reproducing signal.

Consequently, if the return light beam Lr, modulated by the phase pit, is incident on the photodetector 73, the sum of the electrical signals (detection signals), having an output level corresponding to the incident light intensity received by the first and second light-receiving elements I and J, may be directly employed as the reproducing signal. In such case, the first readout signal $S_1$ from the first additive circuit 82a may be employed as the reproducing information signal.

On the other hand, if the light modulation in the return light beam Lr incident on the photodetector 73 is reflected by the vertical magnetic recording layer of the magneto-optical disc 1A, the plane of polarization of the return light beam Lr is rotated in a different direction in association with the direction of the magnetization of the vertical magnetic recording layer.

Consequently, a difference between an electrical signal having an output level corresponding to the incident light intensity received by the first light-receiving element I irradiated with the P-polarized component of the return light beam (detection signal) and an electrical signal having an output level corresponding to the incident light intensity received by the second light-receiving element J irradiated with the S-polarized component of the return light beam (detection signal) may directly be utilized as the reproducing signal. In such case, the second readout information signal $S_2$ from the first subtractive circuit 83a may be utilized as the reproducing information signal for the magneto-optical disc 1A.

Figure 9:
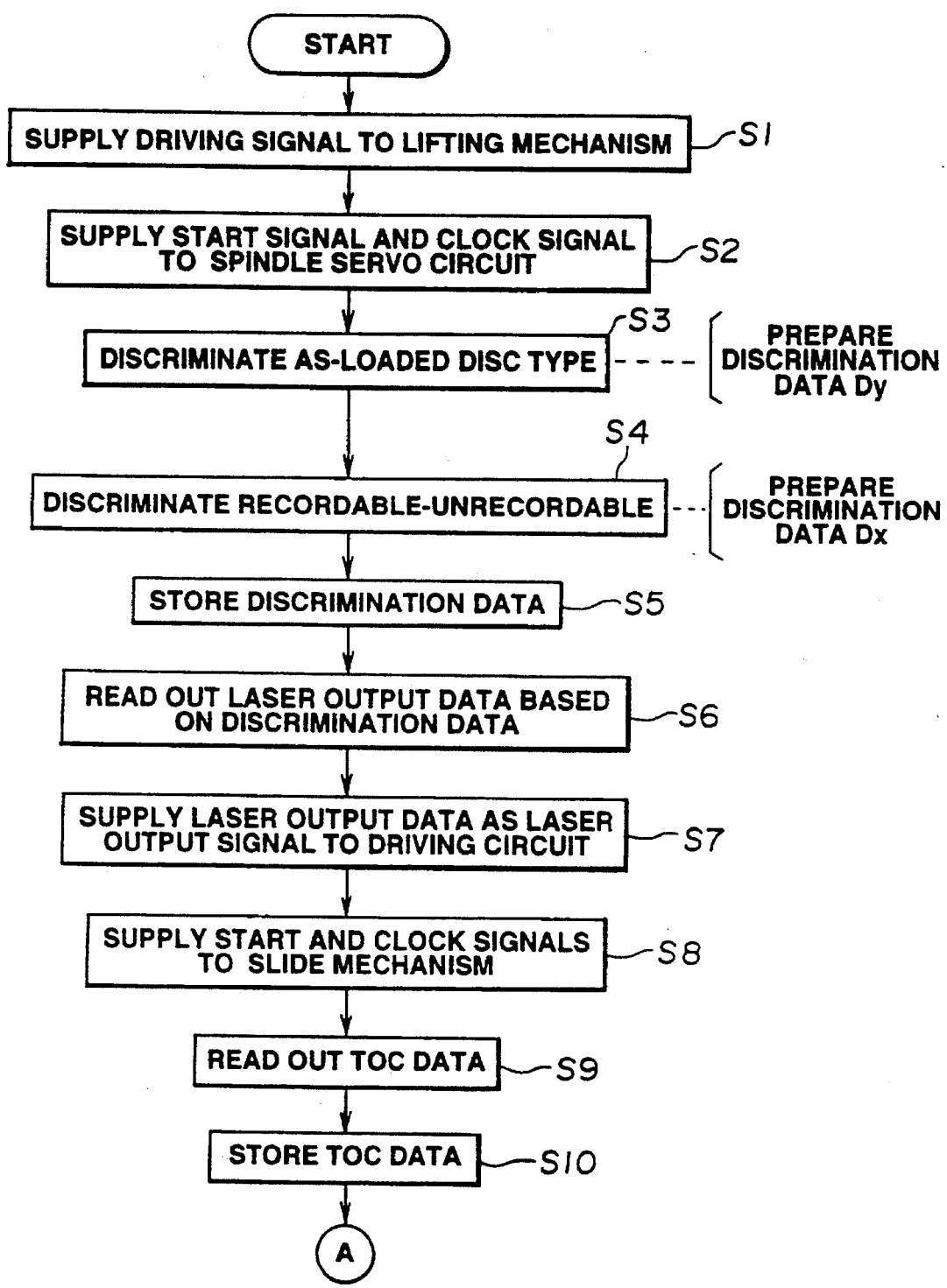
FIG. 9 is a flow chart or illustrating the operation of the recording and/or reproducing apparatus according to the present invention as well as signal processing and control operations of a system controller.
Figure 10:
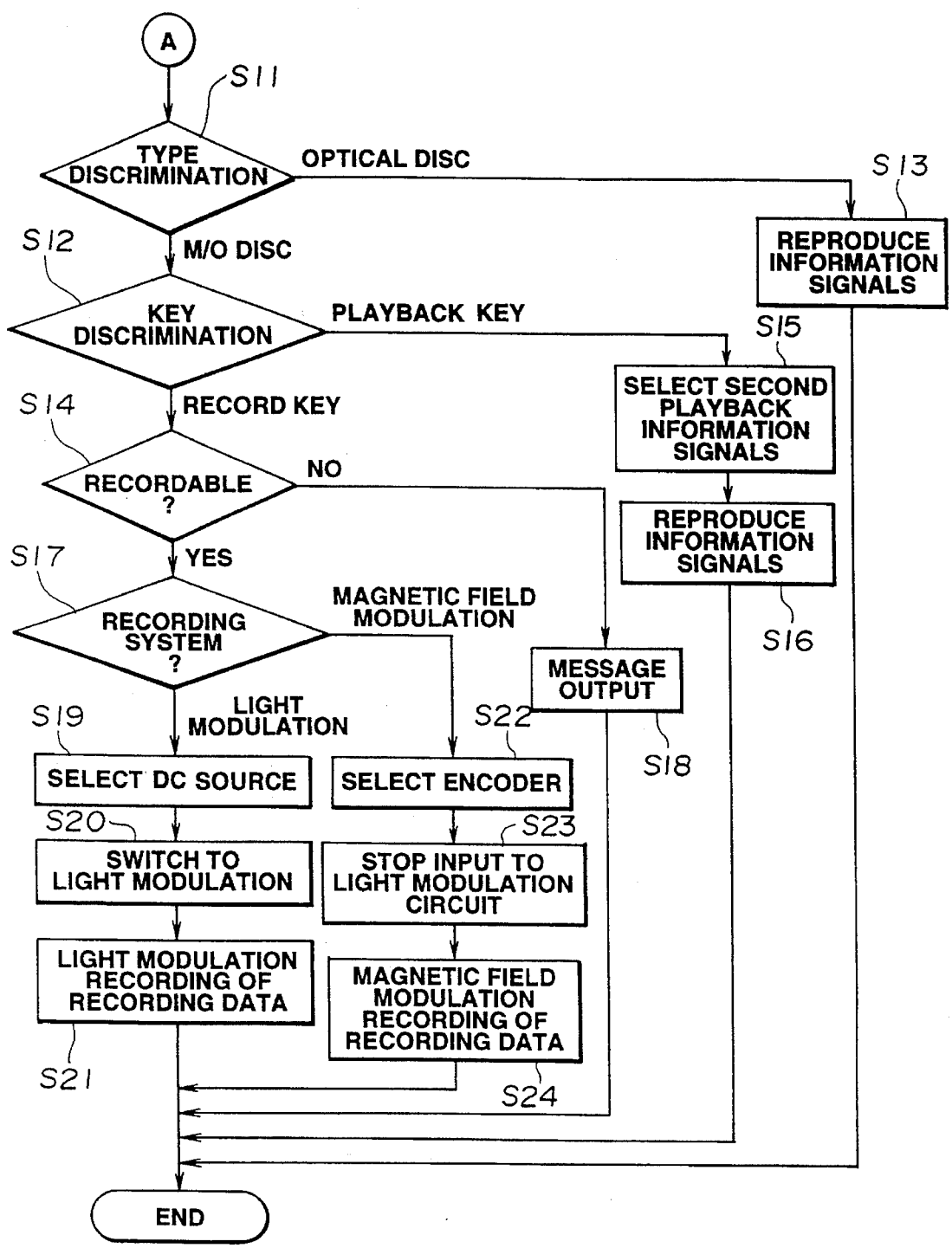
FIG. 10 is a flow chart continuing to the flow chart of FIG. 9 and illustrating the signal processing and control operation of the system controller.
Figure 11:
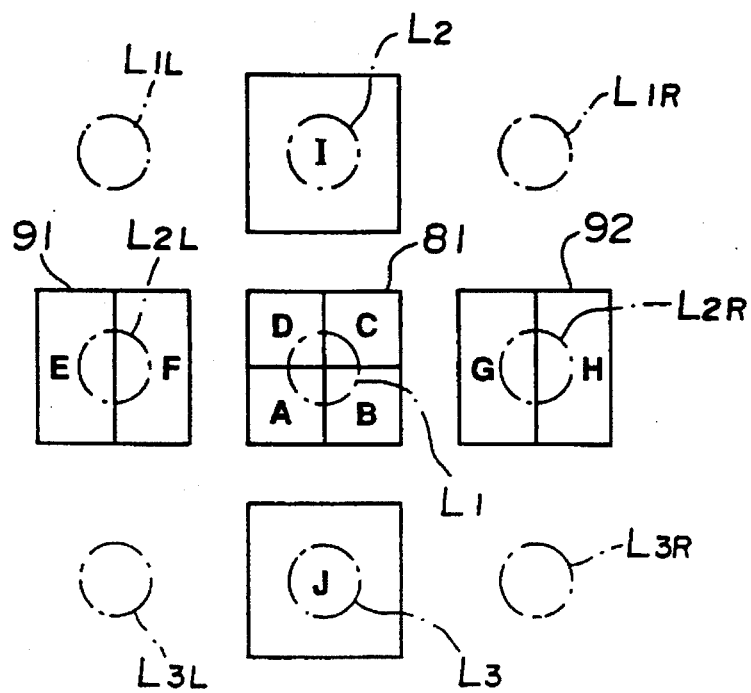
FIG. 11 is diagrammatic view showing a modification of the photodetector provided in the optical head according to the present invention.
Figure 12:
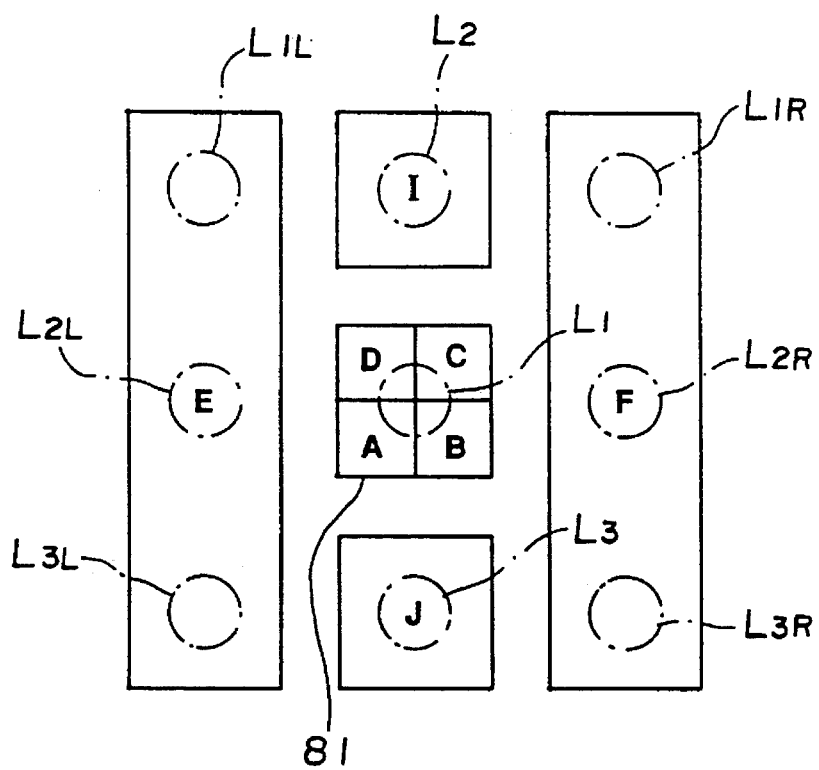
FIG. 12 is diagrammatic view showing another modification of the photodetector provided in the optical head according to the present invention.
Figure 13:
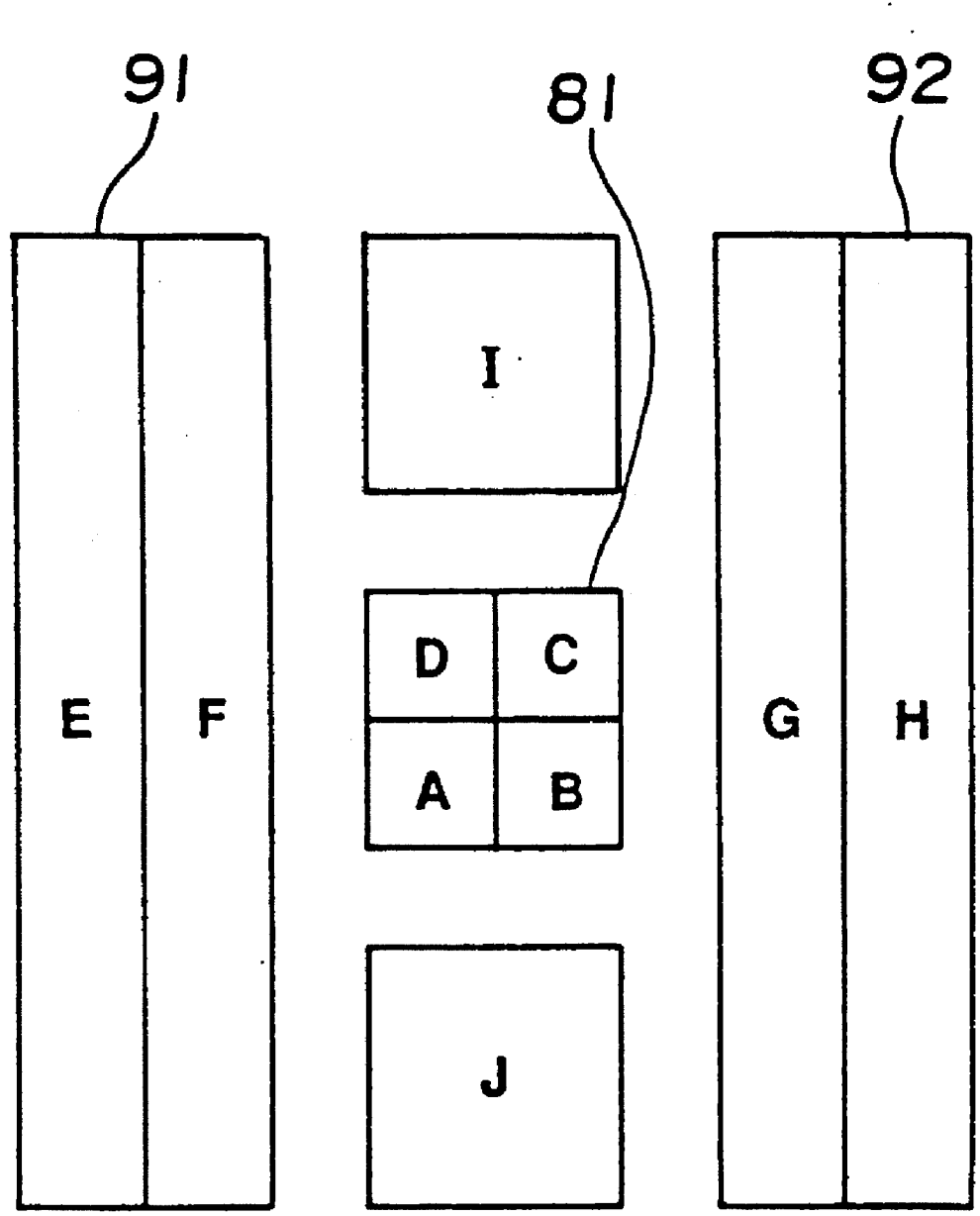
FIG. 13 is diagrammatic view showing yet another modification of the photodetector provided in the optical head according to the present invention.

Referring to the flow-chart of FIG. 9, the operation of the recording and/or reproducing apparatus will be hereinafter explained in connection with the signal processing and the control operation of the system controller 34. Explanation is made beginning from the state in which the disc cartridge 2 is inserted into the cartridge holder, not shown.

Based on the loading completion of the disc cartridge 2, driving signals are supplied at step S1 to a lifting mechanism of a known construction, not shown. Based on the entry of driving signals from the system controller 34, the lifting mechanism lifts the spindle motor 21 to load center the hub 11 of the disc 1 on the turntable at the foremost part of the spindle motor 21. On loading completion, the system controller 34 outputs a starting signal and a clock signal to the spindle servo circuit 24 which then causes the spindle motor 21 to be rotated by the CAV or the CLV based on the starting signal and the clock signal from the system controller 34.

Based on an on/off signal from each of the selection switches 53, 54, caused by completion of insertion of the disc cartridge 2 into the cartridge holder, the system controller 34 discriminates the type, that is the refelctivity of the disc 1 contained in the disc cartridge 2, while simultaneously giving a decision as to whether or not recording can be made on the disc 1.

Concretely, when the detection signal Sy from the detection switch 54 is an on-signal, for example, a logical '1' signal, it is determined by algorithm that the disc 1 is a low-reflectivity disc, such as a magneto-optical disc. When the detection signal Sy from the detection switch 54 is an off-signal, for example, a logical '0' signal, it is determined that the disc 1 is a high-reflectivity disc, such as a read-only optical disc (step S3). In the signal processing flow, a first decision data Dy is formed depending on the level of the detection signal supplied to the system controller 34. The contents of the first decision data Dy become logical '1' or '0' depending on the level of the detection signal Sy.

On the other hand, if the detection signal Sx from the other detection switch 53 is an on-signal, that is a logically high or '1' signal, it is determined by algorithm that recording on the disc 1 is possible, whereas, if the detection signal Sx is an off-signal, that is if it is a logically low or '0' signal, it is determined that recording can not be made on the disc 1 (step S4). In such case, a second decision data Dx, corresponding to the level of the detection signal Sx supplied to the system controller 34, is formed, with the contents of the second decision data Dx becoming logically '0' or '1' depending on the level of the detection signal Sx.

These decision data Dx, Dy are temporarily recorded in a predetermined array parameter region of a RAM 57 or stored as a flag information (step S5).

Based on the disc type indicating discrimination data Dy, among the stored discrimination data Dy and Dx, the system controller 34 reads out from a fixed data storage area of the ROM 55, a laser output control data Do which is to be supplied to the laser light source 71.

Meanwhile, since the reflective layer of Al or Au is formed on the read-only optical disc 1B, as a high reflectivity optical disc, it has a reflectivity higher than that of the magneto-optical disc 1B by 80% or more, so that the inrtensitye of reflected light beam Lr from the read-only optical disc becomes exceedingly larger. The four-segment detector 81 and the first to fourth light-receiving elements I, J, E and F making up the photodetector 73 exhibit a knee in their photoelectric conversion characteristics.

That is, these characteristics are substantially linear within a range up to a certain knee point from the zero light volume state, while the characteristics become non-linear above this light intensity to produce saturated states. For producing satisfactory reproducing signals, it is critical to employ the linear range of the characteristics. However, if the return light beam Lr having an abundant reflected light intensity falls directly on the photodetector 73, saturation of photoelectric conversion is induced in each of the four-segment detector 81 and the first to fourth light-receiving elements I, J, E and F, thus leading to an inconvenience that the reproducing signals or various error signals cannot be read.

Thus the system controller 34 provides a variable bias voltage supplied to the laser light source 71, depending on the type of the disc 1, for setting an optimum laser output for photoelectric conversion by the photodetector 73. For example, for the high-reflectivity read-only optical disc 1B, the bias voltage to be applied to the laser light source 71 is set so that the output of the light beam L becomes low level. Conversely, for the magneto-optical disc 1A having a lower reflectivity on the order of 15 to 30%, the bias voltage to be applied to the laser light source 71 is set so that the output of the light beam L becomes high level.

Thus the laser output control data Do corresponding to the laser output level associated with the type of the disc 1 is set in the fixed data storage area of the ROM 55. The system controller 34 discriminates the type of the disc 1, depending on the detection signals Sx and Sy from the detection switches 53 and 54, to read out the corresponding laser output control data Do from the fixed data storage area of the ROM 55. The data Do is converted by a D/A converter 60 into an analog laser output control signal So which is supplied to the driving circuit 31 of the laser light source So (step S7). The bias voltage of the laser driving circuit 31 is set to a voltage corresponding to the output level of the laser output signal So. A driving current i corresponding to the thus set bias voltage flows in the laser light source 71 so that the light beam L having an output level proportionate to the driving current i is radiated from the laser light source 71.

The system controller 34 supplies a driving signal and a clock signal to a conventional slide mechanism for the optical head, not shown (step S8). This slide mechanism causes the optical head 25 and the magnetic head 52 to be moved in the radial direction of the disc 1 based on the driving signal and the clock signal from the system controller 34. With the optical head 25 positioned at the most inner side postion of the recording area of the disc 1, attribute data, that is TOC data of the disc 1, are read out from the disc 1 (step S9).

Since the light beam L is set to an optimum output, depending on the disc 1, it becomes possible to use the linear range of the characteristic curve for photoelectric conversion in the photodetector 73, so that the electrical signal (detection signal) corresponding to the return light intensity may be outputted satisfactorily from the respective light receiving elements. These TOC data are pre-recorded on both of the read-only optical disc and the magneto-optical disc by the phase pits. These TOC data have e.g. data indicating the type of the disc 1. The system controller 34 outputs a changeover signal Sd to the switching circuit 33 which is changed over to accept the first readout signal $S_1$. The TOC data, read out into the system controller 34 via the processing circuit 32, the switching circuit 33 and the demodulating circuit 34, are stored in the array parameter storage area of the RAM 57 (step S10).

Based on the stored TOC data, the system controller 34 discriminates if the disc 1 loaded is the magneto-optical disc 1A or the read-only optical disc 1B (step S11). If the TOC data indicates that the disc is the magneto-optical disc, control proceeds to step S12. On the other hand, if the TOC data indicates that the disc is the read-only optical disc, control proceeds to step S13.

At step S12, the system controller 34 reads out a push button data Dk from an operating panel 61 to check if the operator has actuated a recording key or a playback key on the operating panel 61. If the recording key is actuated, control proceeds to step S14. If the playback key is actuated, control proceeds to step S15.

At step S13, the information signals recorded by the phase pits on the read-only optical disc 1B are read out by the actuation of the playback key on the operating panel 61. At this time, the switching circuit 33 is changed over to the side of a terminal 33a under a control signal from the system controller 34. This reproducing operation is carried out by the first playback information signal $S_1$ from the processing circuit 32 being transmitted via the switching circuit 33, the demodulating circuit 35, the D/A converter 36 and the low-pass filter 37 at the output terminal out. For this operation, the second discriminating data Dx in the RAM 57 indicating whether not recording is possible is disregarded.

At step S14, the second discriminating data Dx stored in the RAM 57 is used for determining whether or not recording is possible.

At step S15, the changeover signal Sd is supplied from the system controller 34 to the switching circuit 33. The switching circuit 33 selects the readout signal $S_2$ as an input. Based on the operation by the playback key of the operating panel 61, the information signals recorded on the vertical magnetic recording layer of the magneto-optical disc 1A are read. At this time, the switching circuit 33 is changed over to the side of a terminal 33b under a control signal from the system controller 34. This reproducing operation is carried out by the second readout signal $S_2$ from the processing circuit 32 being transmitted via the switching circuit 33, the demodulating circuit 35, the D/A converter 36 and the low-pass filter 37 to the output terminal out (step S16).

The output address data Da of the demodulating circuit 35 is supplied to the system controller 34 so as to be used for controlling the rotation of the spindle motor 21 or the scanning position of the optical head 25 during the seek operation.

If the recording is decided to be possible at step S14, control proceeds to step S17. If the recording is decided to be not possible at step S14, control proceeds to step S18. At step S17, the TOC data stored in the RAM 57 is used to determine if the recording system for the magneto-optical disc 1A is the light modulation system or the magnetic field modulation system.

If the modulation system is determined at step S17 to be the light modulating system, the system controller 34 supplies changeover signals Sg and Se to the switching circuits 51 and 47, respectively, to set the input to the magnetic head driving circuit 49 to the dc source side (step S19), while switching the recording data W from the EFM encoder 46 to the side of the light modulating circuit 48 (step S20). This enables light modulation recording of the recording data W to be made on the magneto-optical disc 1A (step S21).

If the modulation system is determined at step S17 to be the magnetic field modulation system, the system controller 34 supplies changeover signals Sg and Se to the switching circuits 51 and 47, respectively, to set the input to the magnetic head driving circuit 49 to the side of the EFM encoder 46 (step S19), while interrupting the supply of the recording data W to the light modulating circuit 48 (step S22). This enables magnetic field modulation recording of the recording data W to be made on the magneto-optical disc 1A (step S24).

If recording is found at step S14 to be not possible, the system controller 34 reads out a message data Dm indicating recording being impossible from a message data storage area in the ROM 55 to output the message data to display it on a display device 62 constituted by a liquid display or the like (step S18).

In the reproducing operation (steps S13 and S16) and the recording operation (steps S2 and S24), the tracking error signal St and the focusing error signal Sf are detected and the focusing point adjustment for the objective lens 26 and the tracking adjustment are performed based on these error signals St and Sf.

Concretely, the focusing error signal Sf is generated in the processing circuit 32 based on the output detection signal of the four-segment detector 81 shown in FIG. 8. The focusing error signal Sf thus generated is supplied to the focusing servo circuit 29. Based on the focusing error signal Sf, supplied thereto, the servo circuit 29 causes the driving current to flow through the focusing coil 27 in the actuator to drive the actuator. The objective lens 26 is moved in a direction towards and away from the disc 1 under a vertically directed driving force generated by the focusing coil 27 and the magnetic circuit. As a result, the light beam L from the laser light source 71 is converged on the disc 1 to follow vertical movements of the disc 1 caused by deviation of the disc surface from horizontal. In such case, the objective lens 26 is moved vertically depending on the polarity and level of the driving current supplied to the focusing coil 27.

As for the tracking adjustment, tracking error signal St is generated in the processing circuit 32, based on detection signal from the third and fourth light-receiving elements E and F in FIG. 8, so as to be supplied to the tracking servo circuit 30. Based on the tracking error signal St, supplied thereto, the servo circuit 30 causes the driving current to flow through the tracking coil 28 in the actuator to drive the actuator. Under the driving force in the radial direction of the disc 1, generated by the tracking coil 28 and the magnetic circuit, the objective lens 26 is moved in the radial direction of the disc 1 to cause the center light beam (0th order light), among the three light beams as divided by the diffraction grating 76, to follow the track center. In this case, the objective lens 26 is moved in the radial direction of the disc 1 depending on the polarity and level of the driving current supplied to the tracking coil 28.

During focusing point adjustment and tracking adjustment by the servo circuits 29 and 30, the system controller 34 reads out servo gain setting data (optimum gain data depending on the type of disc 1) from the fixed data storage area of the ROM 55. This servo gain setting data are translated by the D/A converter 63 into analog servo gain setting signal Ps which is supplied to both servo circuits 28 and 30. The servo circuits 28, 30 have the respective servo gain values set in accordance with the servo gain setting signal Ps supplied thereto to cause the focus point adjustment for the objective lens 26 and tracking adjustment to be achieved at the optimum servo gain depending on the type of the disc 1.

With the recording and/or reproducing apparatus, in which the light beam L radiated from the laser light source 71 is divided by the diffraction grating 76 into three light beams L and the return light beams reflected back by the Wollaston prism 78 are further split into a sum total of nine return light beams Lr, the light beams $L_1$ and ($L_{2L}$; $L_{2R}$) necessary for detecting focusing error and tracking error and light beams $L_1$ and P-and S-polarized light components $L_2$, $L_3$ necessary for detecting address information signals may be taken out from the return light beam Lr travelling on a single light path without the necessity of necessity of splitting the return light beam Lr by the beam splitter into components which follow the light paths 90° separated from each other, as in the conventional system.

Besides, since the plural light-receiving elements taking charge of the photoelectric conversion are arrayed at the positions irradiated with the light beam components for constituting the photodetector 73, the read-only optical disc 1B and the magneto-optical disc 1A, operating under a different reproduction principle, may be reproduced by the single photodetector 73. In addition, since only one photodetector 73 suffices, the optical head 25 may be reduced in size.

On the other hand, a light intensity of the light beam L radiated from the laser light source 71 is changed depending on the reflectivity of the read-only optical disc 1B and that of the magneto-optical disc 1A. As a results thereof, photoelectric conversion by the plural light-receiving elements in the photodetector 73 may be performed in the linear region of the associated characteristic curves to avoid the undesirable saturation of the servo system.

In the above-described embodiment, the third and fourth light-receiving elements E and F of the photodetector 73 are formed by a square-shaped light-receiving regions. However, alternatively, each of the third and fourth light-receiving elements E, F may be constructed as two-segment detectors 91, 92 in which two strip-shaped light-receiving elements E, F and G, H are formed in adjacency to each other in the track arraying direction, that is along the radius of the disc 1. In such case, the differential push-pull system, represented by the equation (3), may be employed as the detection system for the tracking error signal St.

$$St = (A+D) - (B-C) + G\{(E-F)+(G-H)\} \quad (3)$$

Besides, as a modification of the photodetector 73, the respective light-receiving areas in the third and fourth light-receiving areas E and F may be extended along the tangent to the track. In such case, all of the return light beams Lr ($L_1$, $L_2$, $L_3$, $L_{1L}$, $L_{2L}$, $L_{3L}$, $L_{1R}$, $L_{2R}$, $L_{3R}$, as split by the Wollaston prism 78, may be utilized to raise the light utilization efficiency. The third and fourth light-receiving elements E and F, formed by extending the light receiving areas in FIG. 12 may naturally be constituted by the two-segment detectors 91 and 92, as in the case of FIG. 11.

On the other hand, with the optical system 74 for the optical head 25 in the above-described embodiment, the collimator lens 75 is arranged between the laser light source 71 and the diffraction grating 76, while the converging lens 79 is arranged between the Wollaston prism 78 and the multi-lens 80. Alternatively, the single converging lens 79 may also be arranged on a light path between the beam splitter 7 and the objective lens 26.

What is claimed is:

1. An optical head device movable along the radius of a disc-shaped optical recording medium for recording and/or reproducing information signals on or from the disc-shaped optical recording medium via a light beam, said device comprising:

a light source;

a diffraction grating arranged on a light path of a light radiated from said light source for splitting a light beam radiated from said light source into at least three light beams;

an objective lens for converging the light beams radiated from the light source and transmitted through said diffraction grating on a signal recording surface of said disc-shaped optical recording medium;

driving means for driving said objective lens along the direction parallel to its optical axis and within a plane perpendicular to said optical axis;

a beam splitter for splitting a light beam incident via said objective lens from the light beam radiated from said light source, photodetector means having a first photodetector having a light-receiving surface divided by two boundary lines into four sections, second and third photodetectors arrayed in a direction parallel to one of said boundary lines on both sides of said first photodetector and fourth and fifth photodetectors arrayed in a direction perpendicular to said one of said boundary lines on both sides of said first photodetector;

a splitting optical element arranged between said photodetector means and said beam splitter on an optical axis of a light beam incident thereon via said objective lens, said splitting optical element splitting each of the three light beams from said diffraction grating into three more light beams; and a focusing error detection optical element arranged between said photodetector means and said beam splitter on an optical axis of a light beam incident thereon via said objective lens, said focusing error detection optical element causing changes in the shape of a spot on the light receiving surface of said first photodetector in accordance with displacement of the disc-shaped optical recording medium in a direction perpendicular to the in-plane direction of the disc-shaped optical recording medium.

2. An optical head device according to claim 1, wherein said first to fifth photodetectors are arrayed on a single plane perpendicular to the optical axis of the return light from the disc-shaped optical recording medium.

\* \* \* \* \*